United States Patent
Mohajer

(10) Patent No.: US 12,505,830 B2
(45) Date of Patent: Dec. 23, 2025

(54) AUTOMATIC SPEECH RECOGNITION WITH VOICE PERSONALIZATION AND GENERALIZATION

(71) Applicant: SoundHound, Inc., Santa Clara, CA (US)

(72) Inventor: Keyvan Mohajer, Los Gatos, CA (US)

(73) Assignee: SOUNDHOUND AI IP, LLC, Santa Clara, CA (US)

(*) Notice: Subject to any disclaimer, the term of this patent is extended or adjusted under 35 U.S.C. 154(b) by 375 days.

(21) Appl. No.: 18/046,137

(22) Filed: Oct. 12, 2022

(65) Prior Publication Data

US 2024/0127803 A1 Apr. 18, 2024

(51) Int. Cl.
*G10L 15/18* (2013.01)
*G10L 15/06* (2013.01)
*G10L 21/013* (2013.01)

(52) U.S. Cl.
CPC ............ *G10L 15/18* (2013.01); *G10L 15/063* (2013.01); *G10L 2021/0135* (2013.01)

(58) Field of Classification Search
None
See application file for complete search history.

(56) References Cited

U.S. PATENT DOCUMENTS

| | | | |
|---|---|---|---|
| 10,068,565 B2 * | 9/2018 | Yassa | G10L 15/065 |
| 10,431,236 B2 * | 10/2019 | Gloge | G10L 21/003 |
| 10,726,828 B2 * | 7/2020 | Fukuda | G10L 15/063 |
| 11,270,721 B2 * | 3/2022 | Lu | G10L 21/013 |
| 2018/0247640 A1 * | 8/2018 | Yassa | G10L 13/10 |
| 2019/0180759 A1 * | 6/2019 | Fontaine | H04W 12/02 |
| 2021/0089626 A1 * | 3/2021 | Ross | G10L 21/013 |
| 2021/0304769 A1 * | 9/2021 | Ye | G10L 15/065 |
| 2024/0105203 A1 * | 3/2024 | Bittner | G10L 21/0264 |

FOREIGN PATENT DOCUMENTS

WO WO-2013000868 A1 * 1/2013 ............ G10L 15/22

OTHER PUBLICATIONS

Serizel, Romain, and Diego Giuliani. "Deep-neural network approaches for speech recognition with heterogeneous groups of speakers including children." Natural Language Engineering 23.3 (2017): 325-350. (Year: 2017).*

Serizel, Romain, and Diego Giuliani. "Vocal tract length normalisation approaches to DNN-based children's and adults' speech recognition." 2014 IEEE Spoken Language Technology Workshop (SLT). IEEE, 2014. (Year: 2014).*

Sekii, Yusuke, et al. "Fast many-to-one voice conversion using autoencoders." International Conference on Agents and Artificial Intelligence. vol. 2. SCITEPRESS, 2017. (Year: 2017).*

* cited by examiner

*Primary Examiner* — Douglas Godbold
(74) *Attorney, Agent, or Firm* — Pearl Cohen Zedek Latzer Baratz LLP

(57) ABSTRACT

A voice morphing model can transform diverse voices to one or a small number of target voices. Speech recognition on diverse voices can be performed by morphing it to a target voice and then performing recognition on audio with the target voice. A source of requests for speech recognition can pass audio and a voiceprint with requests. Speech recognition can run with improved accuracy by biasing an acoustic model for the voice in the audio using the voiceprint. The audio can be used to calculate a new voiceprint, which can be used to update the voiceprint included with the audio. The updated voiceprint can be sent back to the source and then used with future speech recognition requests.

17 Claims, 9 Drawing Sheets

AUTOMATIC SPEECH RECOGNITION WITH VOICE PERSONALIZATION AND GENERALIZATION

BACKGROUND

Automatic speech recognition and natural language understanding are imperfect. They are prone to errors. Different implementations used in different situations have different accuracy levels.

DETAILED DESCRIPTION

Multiple technologies are described below that can be implemented independently or in combination.

Morphing for ASR

Many implementations of automatic speech recognition (ASR) use an acoustic model to infer a sequence of phonemes from speech audio. Some implementations of ASR use a voice morphing model to transform features of the voice audio before it is input to the acoustic model, in effect, the voice morphing model maps data to a distribution on which an acoustic model is trained from a distribution on which the model is not trained. This has a benefit of allowing an acoustic model to be trained on just one or a small number of voices.

It is possible to train the morphing model and the acoustic model separately and in any order. It is also possible to train the models together or finetune either model while holding parameters of the other model fixed. These approaches to training and finetuning avoid error accumulating across models used in series.

The data type of input to an acoustic model is sampled audio with speech. Some example data formats for either or both of the input and output of a voice morphing model are WAV, PCM, Speex, and MP3. Some example sampling rates are 8 kHz, 16 kHz, and 44.1 kHz. Some examples of sample bit depths are 8, 12, 16, and 32 bits per sample.

Training Morphing

Figure 1:
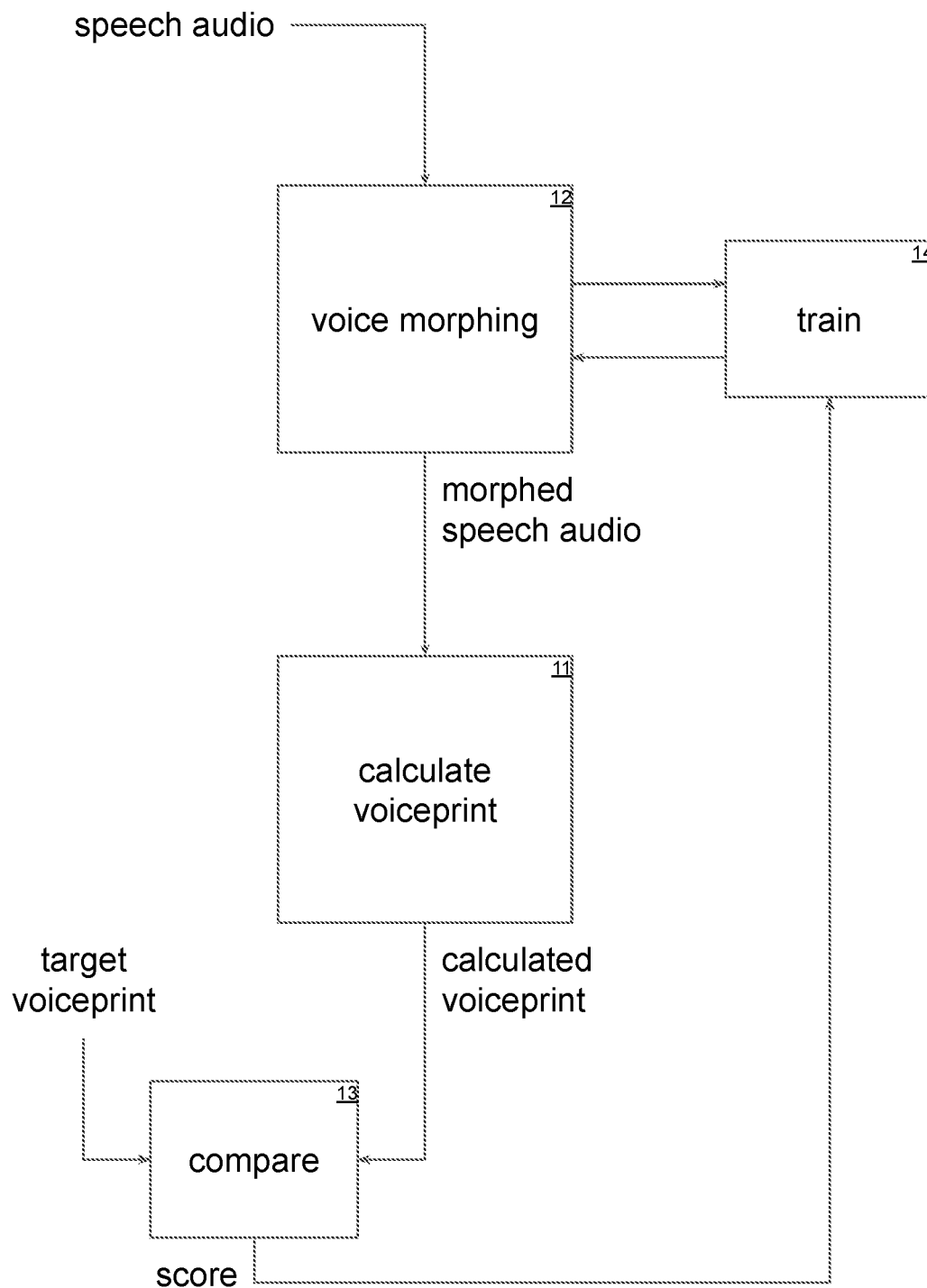
FIG. 1 shows a diagram of training a voice morphing model.

FIG. 1 shows a block diagram of a system and method of training a voice morphing model 12. A voice morphing model 12 generates morphed speech audio from input speech audio. The audio can be a short sequence of samples covering as little as 1 second up to a many hours of speech audio. The speech audio can come from recordings of one or more voices and can even be data synthesized using text-to-speech (TTS) voice synthesis or an equivalent function.

A voiceprint calculator 11 calculates a voiceprint from the morphed speech audio. A voiceprint calculator can be obtained from libraries of open-source audio processing functions, trained from data, designed using algorithms created by experts, or a combination of these techniques. The voiceprint may be represented as a number with one of many possible values or a vector sequence of numbers. Generally, algorithms for speaker identification, speaker verification, or speaker diarization calculate voiceprints in ways that might be applicable. Some example types of voiceprint representations are i-vectors, x-vectors, and d-vectors. I-vectors are reduced dimensional Gaussian mixture model vectors. D-vectors are features extracted from deep neural networks run on individual frames of speech audio. X-vectors are features extracted from a neural network run on a sliding window of frames of speech audio. Various ways are possible to calculate a voiceprint from voice vectors such as calculating an average for each feature value of vectors over time or calculating the average location of vectors within a space.

To train the voice morphing model 12 for a target voice, there must be a target voiceprint. Optionally, there might be a set of target voiceprints. The calculated voiceprint is compared 13 to the target voiceprint to calculate a score. In the case of multiple target voiceprints, one can be chosen by, for example, finding the one that is closest in a multi-dimensional features space to the calculated voiceprint. Over a length of time, the calculated voiceprint will become more stable for any given voice and the score will also become more stable. The score can be calculated various ways such as the sum of absolute differences of feature values, root-mean-squared of differences or cosine distance in a feature space. Generally, a larger score indicates a greater distance between the calculated voiceprint and the target voiceprint.

The calculated score is used as the loss function or as a component of the loss function for training 14. Training modifies parameters of the voice morphing model 12 to attempt to reduce the loss function and thereby create a model that morphs input speech audio to output speech audio that sounds like the target voiceprint. Various types of voice morphing models are possible. One example is an arrangement of one or more neural networks. One such arrangement would have parallel calculations of acoustic similarity and phonetic similarity between input and output along with a voiceprint component. This ensures that the morphed speech audio is still intelligible as phonetic speech and carries similar intonation and other prosodic features.

The training 14 may include components in its loss function other than just a voiceprint score. For example, the loss function might include an ASR accuracy score or other components.

These can help to ensure that the voice morphing model learns to create natural sounding morphed speech audio.

Learning Noise and Distortion Reduction

Training the voice morphing model 14 can include a loss function component that represents an amount of noise. By including a noise component in the loss function, the voice morphing model learns to avoid or eliminate noise in the morphed speech audio.

Similarly, the training 14 can include a distortion component. The distortion can be computed as a difference in non-speech acoustic features between the morphed speech audio and the input speech audio. Including distortion in the training loss function teaches the voice morphing model to avoid causing distortion.

Training ASR

Figure 2:
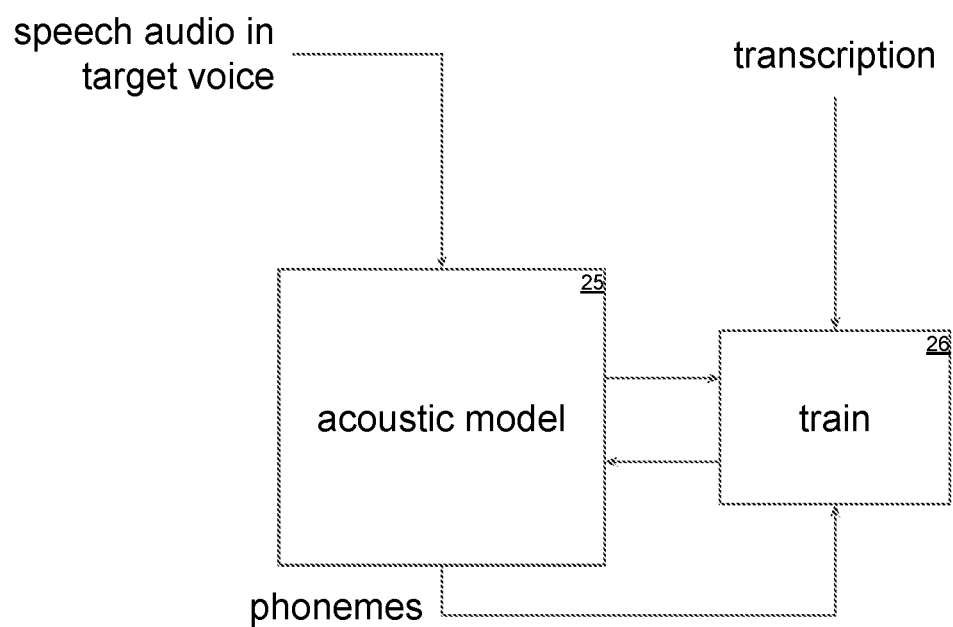
FIG. 2 shows a diagram of training an acoustic model.

FIG. 2 shows a block diagram of a system and method of training an acoustic model 25. The acoustic model calculates one or more hypothesized sequences of phonemes from a sequence of speech audio. The speech audio can be spoken or synthesized with a specific target voice. The sequence of voice audio can have a corresponding transcription. The transcription may be entered by a person listening to the speech audio and typing in the words. The transcription may be entered by a person looking at words recognized by a preexisting ASR model and identifying and correcting errors. The transcription can already correspond to the speech audio if the speech audio was captured from a person reading the words of the transcription or if the speech audio was synthesized by TTS from the words of the transcription.

As part of training 26, the recognized phonemes are compared to a phonetic sequence corresponding to the transcription. Where there is a difference, the training 26 adjusts parameters of the acoustic model 25 to improve the statistical likelihood of inferring phoneme sequences that match transcriptions.

The ability to calculate acoustic model parameters that are statistically very likely to allow inference of the correct phoneme sequence is easier if all of the speech audio is spoken or synthesized with a consistent target voice or a small number of target voices. Accuracy can also be improved for a gender diverse population of end users by choosing a gender indistinct voice as a single voice for training the acoustic model.

The acoustic model can be trained on the transcribed speech in a target voice from a single speaker without morphing. The acoustic model can be trained on transcribed speech in the target voice that is generated by morphing speech audio of multiple distinct voices. The acoustic model can be trained by calculating one or more phoneme sequences over one or many short or long sequences of voice audio and then calculating an error rate with the error rate as an input to the training loss function. The longer the training audio run through the acoustic model, the more accurate the training can make it, but the longer the audio used between training iterations, the longer training takes.

Multiple Target Speakers

A voice morphing model can have a single target speaker. A voice morphing model could also be trained to have a selected set of multiple target speakers such as one with each of a male and female voice or ones with a variety of speech accents.

It is also possible to use a voice morphing model that takes a target speaker embedding as an input. As such, the same voice morphing model can be used to morph to many voices when the embedding for those other voices is provided along with the input audio.

The acoustic model can be trained on recordings of a single speaker, recordings of multiple speakers, or morphed audio of any number of speakers cloned to one target voice or more than one target voice. If trained with multiple real or morphed voices, the acoustic model can accept an input indicating one of the voices and condition its phoneme inference on the choice of the target voice.

In some implementations, different source speakers' voices map best to different target cloned voices. This can depend on how the morphing model works. Such implementations can have multiple target embeddings. There are various ways to choose the best one. One way is to try all the target voices and choose the one that produces the highest ASR confidence score.

Joint Training

It is possible to finetune the voice morphing model while keeping the acoustic model fixed. It is also possible to finetune the acoustic model while keeping the voice morphing model fixed. It is also possible to jointly train the voice morphing model and the acoustic model. This can be done by backpropagation of error reduction based on a calculation of the error rate of phoneme inference.

Figure 3:
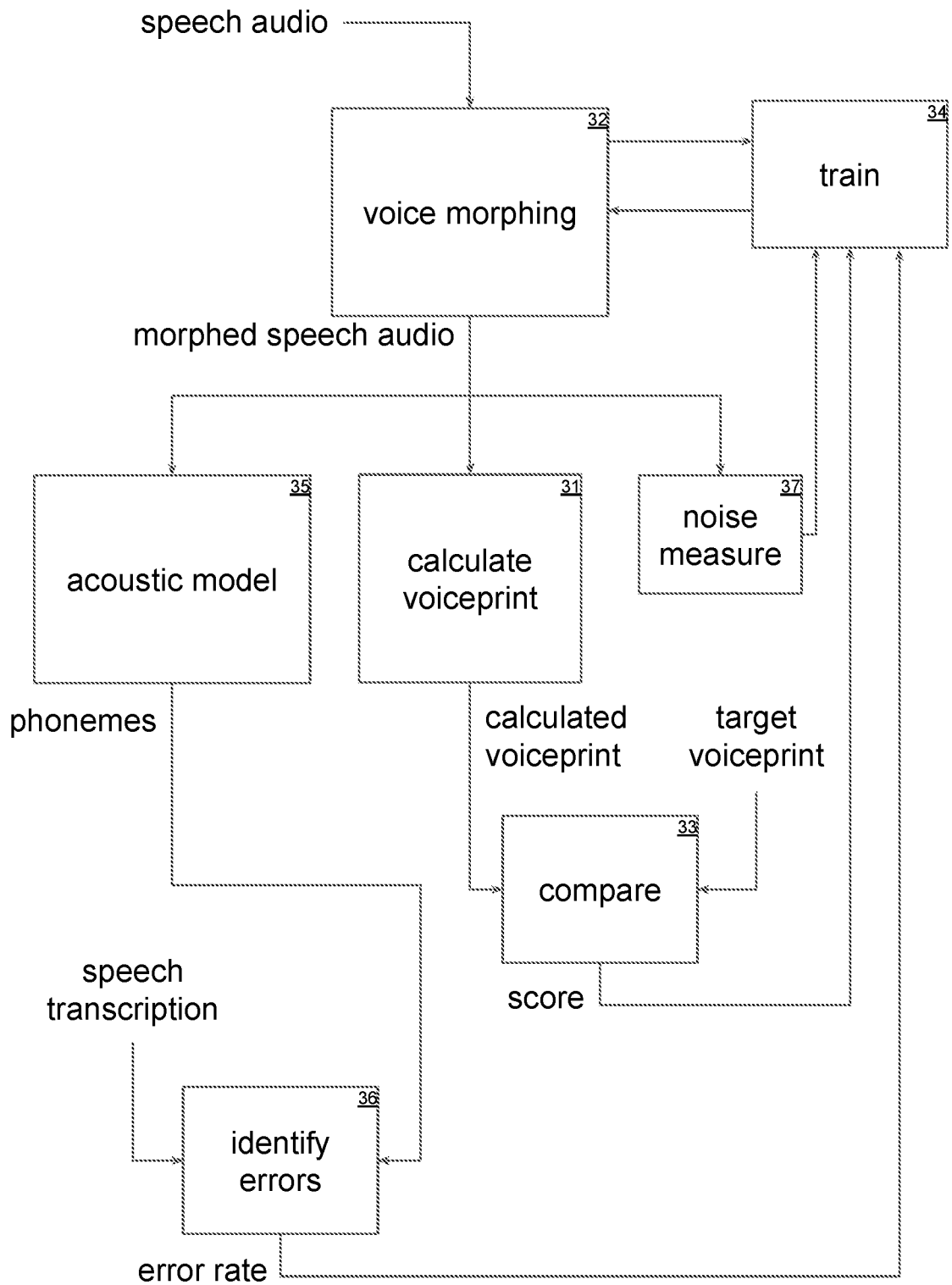
FIG. 3 shows a diagram of training a voice morphing and acoustic model.

FIG. 3 shows a block diagram of an implementation of joint training. A voice morphing model 32 receives speech audio and uses it to generate morphed speech audio. It may be intended for the morphed speech audio to sound like a target voice. A voiceprint calculation 31, such as an i-vector, x-vector, or d-vector calculation model, analyzes the morphed speech audio and calculates a voiceprint. The voiceprint may be a vector. A comparison step 33 compares the calculated voiceprint to a target voiceprint and produces a score that represents the closeness. The score may be, for example, a cosine distance in a common vector space for the calculated voiceprint and target voiceprint. The score can be used as part of the loss function for training 34. The training iteratively changes parameters of the voice morphing model 32 in ways that might decrease the distance between future calculated voiceprints and the target voiceprint.

If the loss function was solely based on the closeness of the calculated voiceprint to a target voiceprint, training the morphing model 32 would cause it to learn to generate output audio data that reverses the voiceprint calculation 31 in such a way that when the voiceprint calculation is run on any audio output by the voice morphing model, the calculated voiceprint would very closely match the target voiceprint, but the audio output by the voice morphing model would not sound like speech. It would sound like an unintelligible buzzing hum.

One way to ensure that the morphed speech audio is intelligible as speech is to analyze the morphed speech audio using an acoustic model 35 to produce a hypothesized sequence of phonemes comprised by the speech. It is possible to tokenize the hypothesized sequence of phonemes into dictionary words, optionally apply a statistical language model to one or more hypothesized phoneme sequences and tokenizations, and thereby infer a sequence of words from the speech. It is also possible to process words of a speech transcription to infer one or more phoneme sequences that would match the reading of the words. Multiple phoneme sequences are possible because some words have multiple pronunciations.

A comparison 36 occurs to identify likely errors between the best hypothesized phoneme sequence and a speech transcription that corresponds to the speech audio. The rate of errors in the string of phonemes indicates how easily the morphed speech audio can be recognized by a pre-trained acoustic model. That is an indication of the intelligibility of the morphed speech audio. The error rate can be a component of the loss function used for training 34.

If the loss function was solely based on the closeness of a calculated voiceprint to a target voiceprint and the error rate of an acoustic model, the trained voice morphing model would learn to produce morphed speech audio with characteristics that reverse the imperfections in the transfer function of the acoustic model. This would cause the morphed speech audio generated by the voice morphing model 32 to be somewhat noisy or distorted. Optionally, a noise measure model 37 can calculate the amount of noise, distortion, or other undesirable artifacts in the morphed speech audio. The noise measure can be one designed by an expert or a trained model. By using a loss function in training 34 that considers the noise measure, it can further improve the intelligibility of the morphed voice audio created by the voice morphing model 32.

An acoustic model 34 for purposes of computing an error rate for training the voice morphing model 32 can be a pre-trained acoustic model that is the same one trained for a single voice or small number of voices and used for inference in conjunction with the trained voice morphing model. Alternatively, the acoustic model 34 used for training the voice morphing model 32 can be a different acoustic model that is either trained to recognize phonemes well for one or multiple or many voices.

Inference

Figure 4:
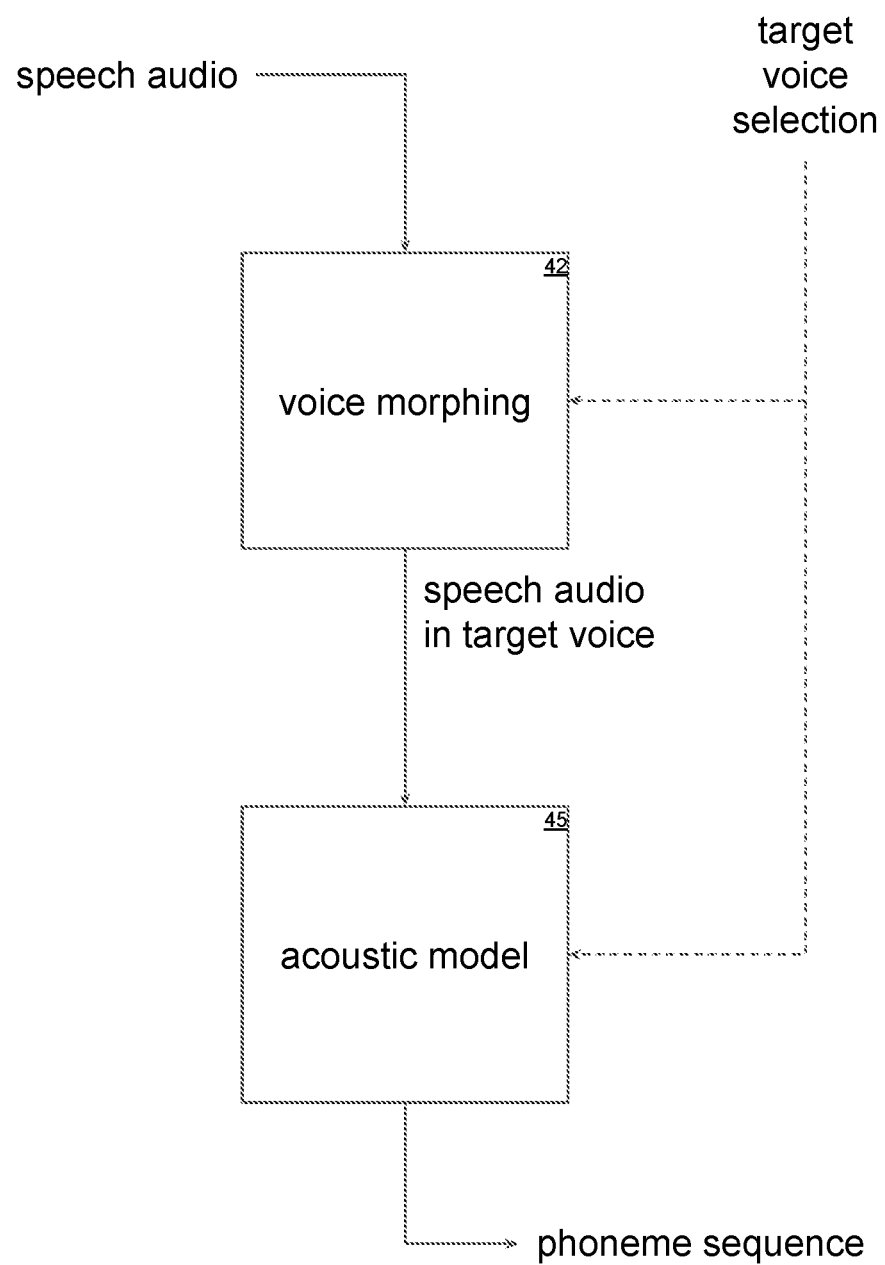
FIG. 4 shows a diagram of phoneme inference from speech audio using voice morphing and an acoustic model.

FIG. 4 shows a computer implemented method of phoneme inference. This can be used at run time in production systems within cloud data centers, network edge devices, or embedded devices independently of a network. The implementation of FIG. 4 includes using a voice morphing model 42 on sampled speech audio to generate morphed speech audio in a target voice. Next an acoustic model 45 uses the morphed speech audio to infer a sequence of phonemes or other phonetic features from the morphed. The acoustic model 45 is one with a significant favorable accuracy bias in favor of the target voice. The acoustic model 45 can be a trained model trained to morph towards a target voiceprint as described with respect to FIG. 3. The acoustic model 45 could be one trained on voice recordings of a single speaker whose voice is the target for voice morphing 42. The acoustic model 45 can also be another kind of acoustic model optimized for a single voice or type of voice.

The voice morphing model 42 and acoustic model 45 can be designed or trained on a plurality of target voices. In some such implementations, a target voice selection can be an input to the voice morphing model 42 and acoustic model 45.

Voice Vector Passing

An acoustic model can be designed or trained to accept sequences of audio samples or sequences of frames of spectral energy information and infer from it what sequence of phonemes was spoken when the audio includes speech. Accuracy of inference can be higher if the acoustic model also takes, as input, a voiceprint. The voice print can be represented by a vector such as an i-vector, x-vector, or d-vector or some other representation that includes information about features specific to the voice producing the speech. If the voice representation is specific to a person, this can be seen as a way of conditionally personalizing the acoustic model for improved accuracy.

Figure 5:
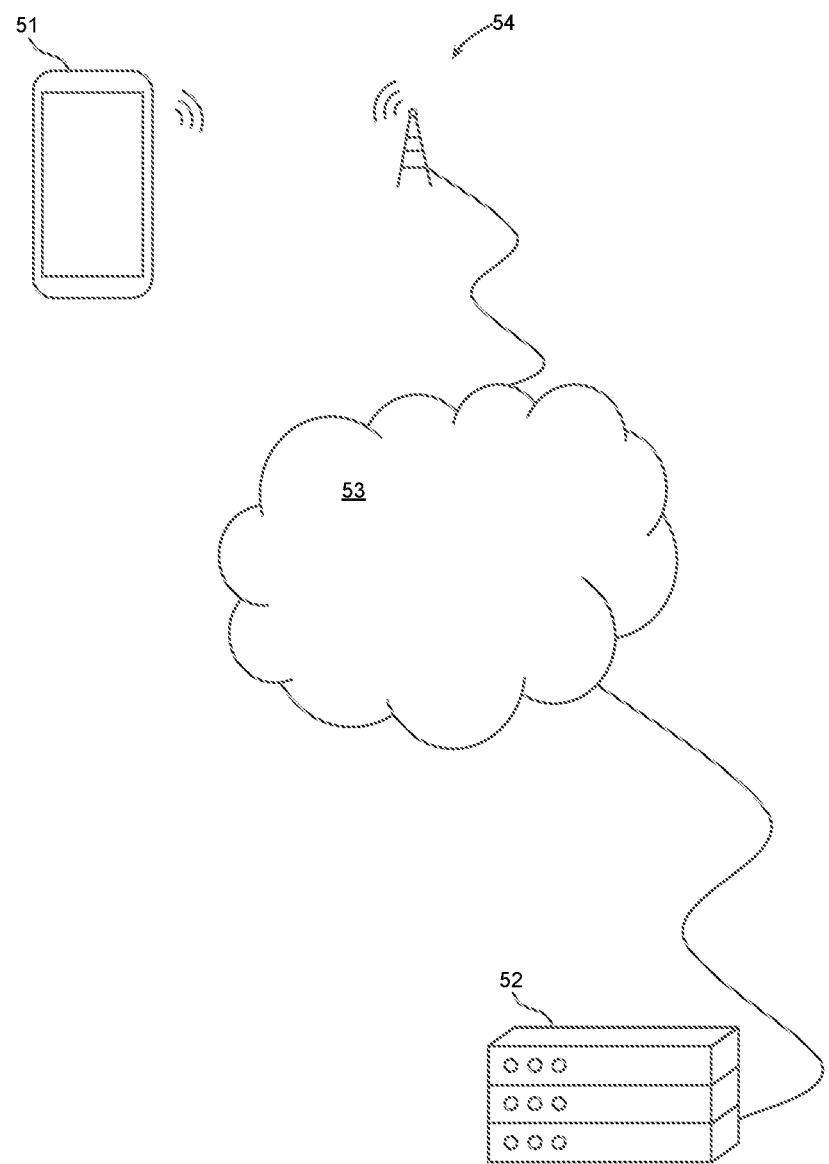
FIG. 5 shows a diagram of communication between a client and a server.

Acoustic models conditioned on voiceprints can be used within devices and in client-server-based automatic speech recognition (ASR). FIG. 5 shows one example of client-server-based ASR. A smartphone 51 is a type of client device. Other examples of client devices include automobiles, kiosks for making purchases, point-of-sale devices, desktop computers, and smart security systems.

The smartphone 51 communicates through a wireless mobile network to a base station 54. Such base stations can be mounted on towers or connected to antennas mounted on towers to have accurate reception of terrestrial broadcast radio waves and transmission to terrestrial receivers such as mobile phones. Other wireless communication systems are possible such as ones that use Wi-Fi within or near buildings or Bluetooth between personal devices or a combination of more than one. Wired networks are possible for stationary clients such as point-of-sale devices. Wired clients, base stations, modems, and other such networking equipment connected to the internet 53.

Through the internet, the base station provides the client with access to a server 52. Many servers are housed in data centers. Using such connectivity, a mobile device can receive audio using one or more built-in microphones and send the audio to one or more processors in the server system. The processors can perform ASR on the captured audio. Server processors can perform ASR on the audio data by executing software instructions stored on one or more non-transitory computer readable media within or connected to the server system such as random access memory (RAM), Flash, or hard disk drives.

Though the examples shown here use a client with a microphone to capture audio and a server at a great distance to perform ASR similar functionality can be performed within a single device.

That is, an interface device such as a microphone can be connected to an analog to digital converter (ADC). With that arrangement, digital audio samples can be stored in a RAM buffer either in a dynamic random access memory (DRAM) chip apart from an ASR process or in on-chip static random access memory (SRAM) or a combination. In various embodiments, the ASR function could be performed by an applications processor or digital signal processor (DSP) or a combination. Application processors, digital signal processors, RAM buffers, and other related functionality are implemented in a single chip or multiple chips in various embodiments.

The following description will refer to a client and server that pass data structures between each other. However, similar data structures can be passed between functions within the memory of chips in a single device. A similar result in improved ASR accuracy is possible within a single such embedded device as is described below regarding a client-server architecture.

Figure 6:
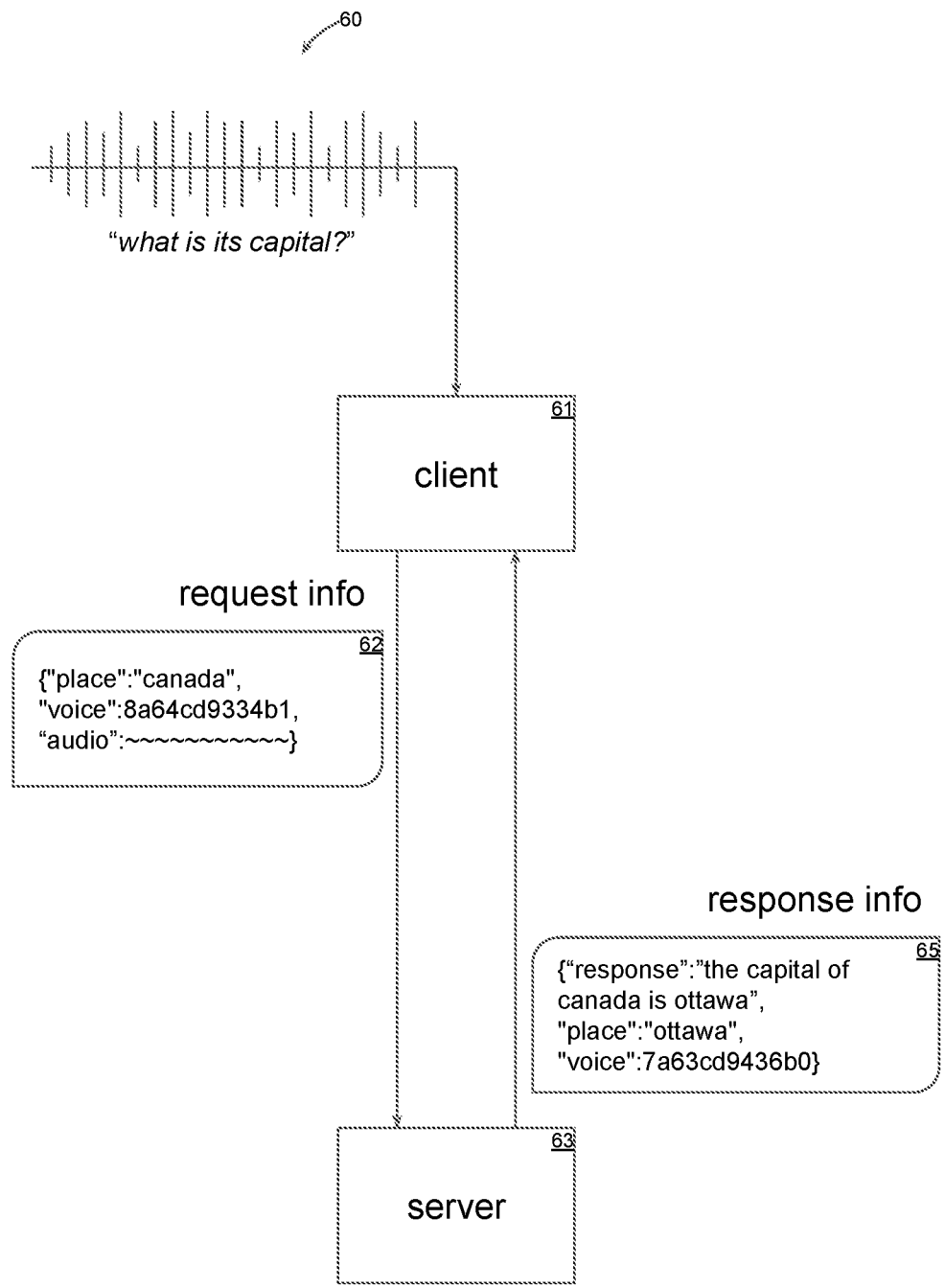
FIG. 6 shows a functional diagram of client-server speech recognition and natural language understanding.

FIG. 6 shows an example implementation in a particular scenario. A speaker speaks the words "what is its capital", which is captured in speech audio 60. Client 61 captures the audio and digitizes it as a sequence of audio samples. Information that can be used for ASR can be passed from client 61 to server 63 within data structures that relate to a request for ASR. This can be called request info.

FIG. 6 shows a request info package 62 that includes the speech audio samples but also other information that might be related to a conversational interaction between a user and a virtual assistant. In this example shown, the request info includes information indicating that a conversation was referring to a specific place and the place is Canada. The request info 62 also includes a voice vector as a 12 digit hexadecimal value. The voice vector is a variable stored in memory within the client.

In some implementations, the server 63 responds to the client 61 with a response data structure 65. This can be called response info. In a system that does simple transcription of speech audio, the request info comprises at least audio that can include speech. The response info would comprise at least text of the transcription. Request info and response info can be represented in application-specific schemas using encoding standards such as JSON or XML.

In the implementation of FIG. 6, the response info does not include a transcription. It contains other information related to a human machine conversational interface between a user and a virtual assistant. The response info 65 includes text of response words "the capital of canada is ottawa". The client can use this text to perform text-to-speech (TTS) audio synthesis and output the audio to the user as a spoken response. The response info 65 also includes information indicating that the conversation now refers to the place Ottawa. The response info 65 also includes a voice vector that is similar but a little bit different from the voice vector included in the request info 62.

In some implementations, the server performs natural language understanding (NLU) besides mere transcription of speech. Natural language understanding uses the words in the speech in the sequence of audio samples. NLU may interpret the words and cause the server to perform some function such as providing an answer to a question. FIG. 6 shows an example of providing an answer "the capital of canada is ottawa" to the question "what is its capital" where the question is associated with the information that the most recent place named in a conversation is "canada".

Figure 7:
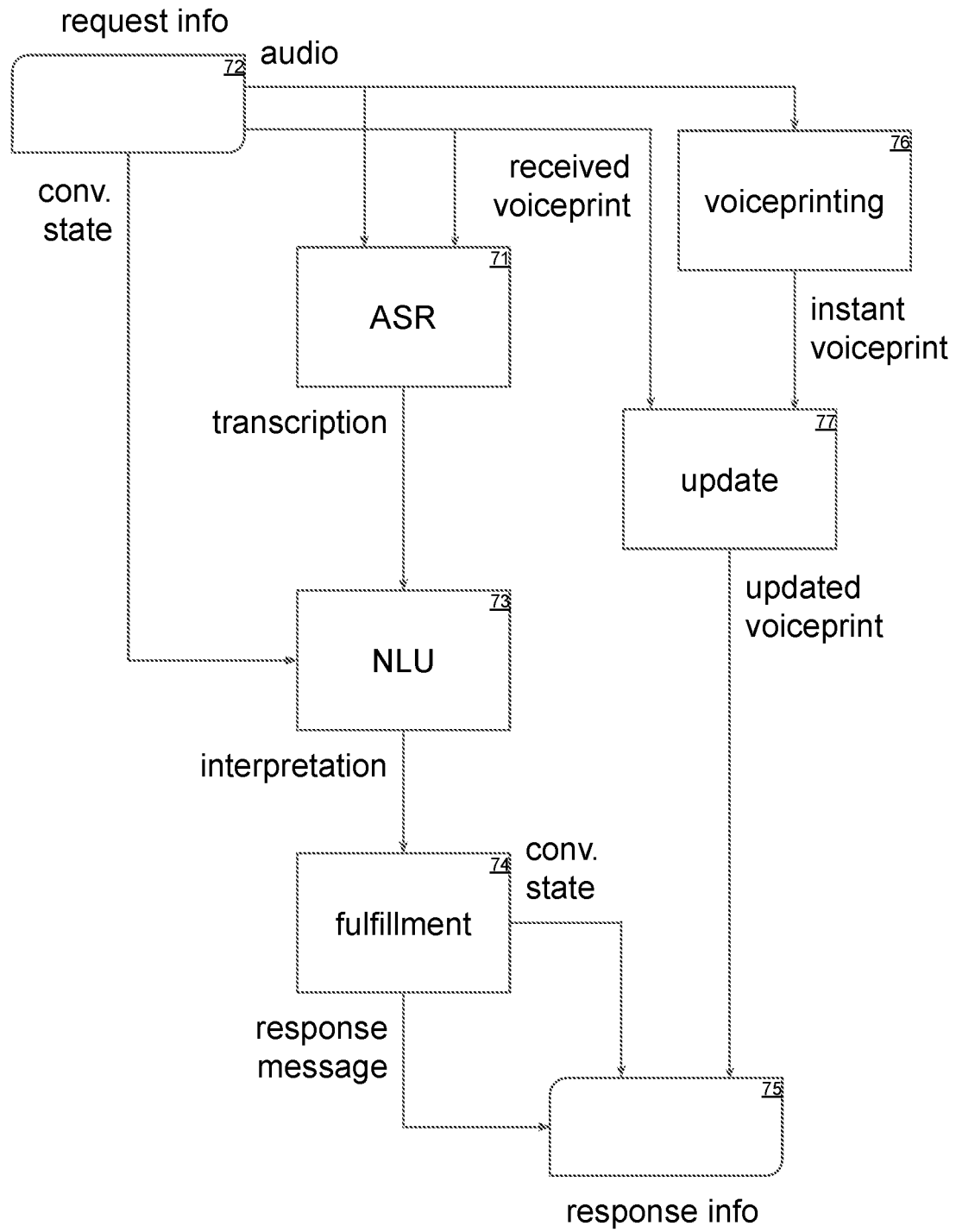
FIG. 7 shows a detailed diagram of speech recognition and natural language understanding with voiceprint updating.

FIG. 7 shows an example of the functions of a speech-based natural language understanding virtual assistant implemented on the server 63. The server receives a request from a client, the request including request info 72. The request info includes audio, which can include speech. The request info also contains a received voiceprint. An ASR function 71 recognizes speech from the audio to produce a transcription. The ASR also uses the received voiceprint to improve the accuracy of its inference of phonemes by conditioning an acoustic model on the voice features represented by the voiceprint value. Essentially, the voiceprint information biases one or more ASR models such that its accuracy is favorable for the voice associated with the voiceprint. ASR can also include information and functions such as dictionaries and statistical language models that can be used to produce the transcription.

An NLU function uses the transcription to compute an interpretation. The interpretation can be a data structure with information such as arguments for a web application programming interface (API) request or other functions that perform useful actions. The interpretation can be used by a fulfillment function 74 that fulfills requests or commands spoken in the received audio. Fulfillment can include a wide variety of functions, which tend to be application specific. Home smart speakers tend to be able to answer trivial questions, invoke music playing functions, and send commands to smart light switches. Automobiles tend to fulfill commands with functions such as turning on vehicle lights, changing a radio station, or navigating to a restaurant. Restaurant ordering systems fulfill requests and commands by adding menu items to orders, reporting prices, and submitting orders to cooks to prepare food. Voice-operated natural language understanding virtual assistants are used in numerous devices and systems in people's lives.

The implementation of FIG. 7 is conversational. To support conversational functionality, the request info 72 includes conversation state information. That is an input to NLU 73, which provides information needed for the NLU to compute an interpretation. For example, interpreting a request "what is its capital" requires NLU to know the name of a country whose capital to look up. With the information that the country is Canada, the NLU can provide a data structure to fulfillment function 74. The fulfillment function performs an API request to Wikipedia to look up the capital of Canada and determines that the answer is Ottawa. Fulfillment function 74 generates the text for the spoken response "the capital of canada is ottawa" to include in the response info 75. The fulfillment function is also designed to recognize that the answer to a question about a capital includes a place name. In the example, Ottawa is the place name. Therefore, the fulfillment function 74 provides "ottawa" as a place name value to include as conversation state information in the response info 75. The client is expected to store the place name from the response info data structure and include it in the request info of the next request. Conversation state info can include many pieces of information of many types that can be useful in conversations such as proper nouns that can be used by NLU to resolve the meaning of pronouns in future request transcriptions.

The audio of the request info 72 is also sent to a voiceprinting function 76. The voiceprinting function uses the audio in the request info to compute an instant voiceprint. The instant voiceprint corresponds to the instance of a request info package being received during the range of time in which it contains speech audio. The instant voiceprint uses a format the same or related to the format of the received voiceprint. The system assumes that the received voiceprint represents the speech of the person whose voice is in the received audio. Therefore, the system reasonably expects the instant voiceprint to indicate similar voice features. However, the voice features of the received voiceprint are ones calculated previously and potentially over many utterances or longer amounts of time. The instant voiceprint is therefore likely to be somewhat less precise by more current than the received voiceprint.

An update function 77 calculates an updated voiceprint from the likely more accurate received voiceprint and the more recent instant voiceprint. The updating can be by a small or large adjustment of the received voiceprint features in the direction of the differences of the same features in the instant voiceprint. The adjustments can be weighted be a factor such as the length of time of voice analyzed in the received audio. Another possible capability is to store a count or time length in the response info to be received in the request info of a future request. The count or time length can indicate an amount of certainty in the received voiceprint, which can be used as a factor to limit the amount of adjustment. The request count can be incremented or time length can be increased with each request that the server processes and sent to the client in the response info data structure 75. Various other machine learning techniques such as gradient descent and other algorithms for tuning feature weights in models can be used in various embodiments.

In the implementation shown in FIG. 7, the updated voiceprint is included in the response info data structure 75, along with the response message and conversation state information. The response info data structure is sent to the client device with the expectation that the client device will store the conversation state information and the updated voiceprint and send it back to the server with the next request.

Using a voiceprint to bias accuracy of an ASR process for a specific voice, updating the voiceprint, and using the updated voiceprint in the next iteration of the ASR process provides high ASR accuracy. High accuracy results in a lower phoneme error rate and a resulting lower word error rate. It provides improved immunity to distortional effects of the transfer function of analog components of capturing voice such as accumulates through the microphone and ADC. It solves for quick adaptation from a cold start generic acoustic model for the first user interaction to quickly improve for ongoing usage. It adapts to changing users of the same device if the voiceprint is associated with a device identity. It adapts to changing devices if the voiceprint is associated with a user identity.

Including a voiceprint and updated conversation state in response info from a server to a client and having the client send the voiceprint and conversation state from client to server enables processing requests from clients on any out of many servers that have the same processing ability without the need for servers to pass conversation state or device-/user-specific voiceprints between each other. This enables efficient load balancing of voice virtual assistant functionality, including efficient geographic distribution and changes between servers due to network changes such as a mobile device switching between wireless base stations or switching from a wireless network to a Wi-Fi network. It also enables switching between or simultaneously using both device-local processing and remote server processing of the same virtual assistant requests. That enables access to higher accuracy, higher performance ASR and NLU models in the cloud and globally dynamic information when a network connection is available for a device and best available local processing when a network connection is intermittently unavailable.

Computers

Figure 8:
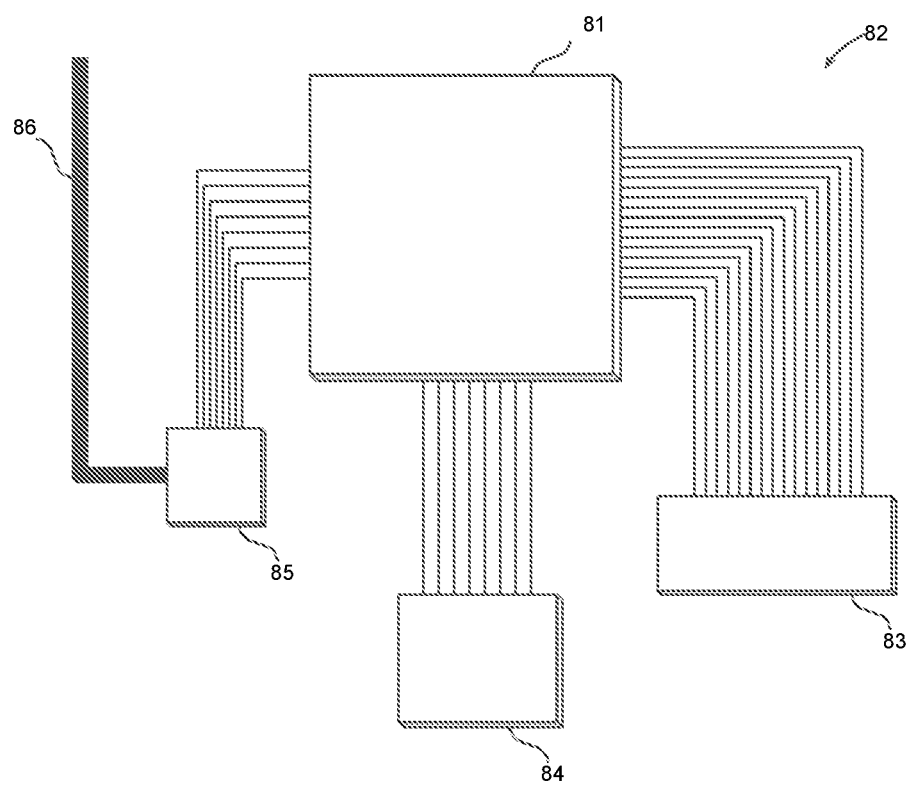
FIG. 8 shows a computer processor-based device with non-transitory computer readable media.

FIG. 8 shows an example of components on a printed circuit board within a computing device that can be programmed to implement methods described above. A packaged central application processor chip 81 is soldered to traces 82 on a printed circuit board (PCB). Through PCB traces, the apps processor chip can access a DRAM chip 83. The DRAM is volatile storage that provides for the apps processor to write and read computer code instructions that enable the apps processor to perform functions described above. The DRAM chip 83 is also able to store data structures, audio data samples, voiceprints, conversation state variables, the stack and heap data for computer programs running on the apps processor, operating system instructions and data, and other types of information needed for implementing computerized systems.

The apps processor 81 boots up by reading instructions from non-volatile flash memory chip 84 through PCB traces. Flash memory chip 84 is a non-volatile non-transitory computer readable medium that can store computer instruction code that causes the apps processor to perform methods described above. The implementation shown in FIG. 8 uses wireless network communications to send and receive requests and responses between client and server. To do so, the apps processor 81 connects through PCB traces to an external modem chip 85. The modem chip connects through an amplified radio frequency interface to an antenna 86. The antenna enables radio signaling between devices and wireless base stations, between devices and WiFi access points, between bluetooth hosts and devices, and between servers in data centers.

Figure 9:
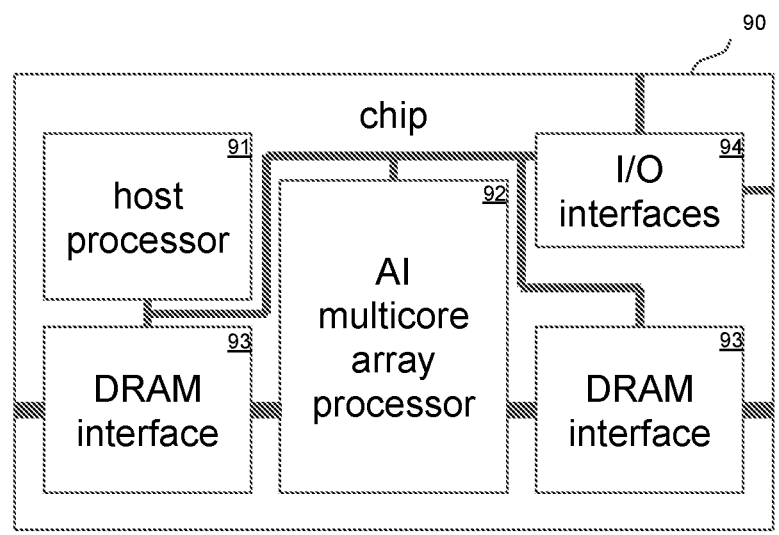
FIG. 9 shows a diagram of a data processing chip.

FIG. 9 shows the floorplan of an apps processor chip 90. It includes a host processor 91, which boots the chip, runs operating system software, and runs host software. The host software can implement methods described above in part by calling software functions run on an on-chip artificial intelligence (AI) multicore array processor 92. The host processor 91 and AI multicore array processor 92 access DRAM chips through two DRAM interface cores 93. Having multiple DRAM interfaces allows for high bandwidth access to RAM and therefore high throughput processing. Such high throughput provides for high speed in training models and for fast processing that allows the apps processor chip to revert soon to a low power mode after inferences and therefore reduce leakage power consumption.

The apps processor chip 90 of FIG. 9 also includes an array of input and output interfaces cores 94 that can perform functions such as reading and writing data from a flash memory chip, reading and writing data to an external modem chip, receiving digital audio data from an external ADC chip, blinking LEDs, displaying information on a display screen, and other functions of devices and servers to implement methods described above.

Various implementations of the present invention have been described above. As described above, various implementations are computer-implemented methods. The descriptions include features that are particular to the implementations they describe. However, many features are optional. For example, conversation state variables need not be included in request and response info packages and servers need not have wireless interfaces. Other features not described can be used. For example, other information besides audio, conversation state, and voiceprints can be passed between servers and clients in request and response info packages and devices can have many kinds of interfaces not described.

The invention claimed is:

1. A computer-implemented method of training an acoustic model, the method comprising:
obtaining a voiceprint calculator that calculates a score for the distance between a voice in speech audio and a target voice;
training a voice morphing model to morph speech audio to the target voice, the training using speech audio of multiple distinct voices with a loss function dependent on the score;
training an acoustic model on transcribed speech in the target voice; and
tuning the voice morphing model and acoustic model by backpropagation of error reduction based on a measurement of the error rate of phoneme inference,
wherein the acoustic model can infer phonemes from audio morphed by the voice morphing model.

2. The method of claim 1 wherein the transcribed speech in the target voice is from a single speaker without morphing.

3. The method of claim 1 wherein the transcribed speech in the target voice is generated by morphing speech audio of multiple distinct voices.

4. The method of claim 3 further comprising:
finetuning the voice morphing model with a loss function dependent on an error rate of the acoustic model when run on the morphed audio of transcribed speech.

5. The method of claim 1 further comprising tuning the voice morphing model while keeping the acoustic model fixed.

6. The method of claim 1 further comprising tuning the acoustic model while keeping the voice morphing model fixed.

7. The method of claim 1 further comprising measuring the amount of noise in the morphed speech audio, wherein the loss function further depends on the amount of noise.

8. A computer implemented method of phoneme inference, the method comprising:
calculating a plurality of scores for the distances between a voice in speech audio from multiple distinct voices and a target voice;
training a voice morphing model to morph speech audio to the target voice, the training using speech audio of the multiple distinct voices with a loss function dependent on the scores;
morphing audio of sampled speech to a target voice using the voice morphing model to generate morphed audio; and
inferring a sequence of phonemes from the morphed audio using an acoustic model,
wherein the acoustic model has an accuracy bias in favor of the target voice.

9. The method of claim 8 wherein the acoustic model is conditioned by a choice of the target voice from among a plurality of target voices.

10. A computer-implemented method of training an acoustic model, the method comprising:
- obtaining a voiceprint calculator that calculates a plurality of scores for the distances between each voice of multiple distinct voices in speech audio and a target voice;
- training a voice morphing model to morph speech audio to the target voice, the training using speech audio of the multiple distinct voices with a loss function dependent on the scores; and
- training an acoustic model on transcribed speech in the target voice,
- wherein the acoustic model can infer phonemes from audio morphed by the voice morphing model.

11. The method of claim 1 wherein the transcribed speech in the target voice is from a single speaker without morphing.

12. The method of claim 1 wherein the transcribed speech in the target voice is generated by morphing speech audio of multiple distinct voices.

13. The method of claim 12 further comprising:
- finetuning the voice morphing model with a loss function dependent on an error rate of the acoustic model when run on the morphed audio of transcribed speech.

14. The method of claim 1 further comprising tuning the voice morphing model while keeping the acoustic model fixed.

15. The method of claim 1 further comprising tuning the acoustic model while keeping the voice morphing model fixed.

16. The method of claim 1 further comprising tuning the voice morphing model and acoustic model by backpropagation of error reduction based on a measurement of the error rate of phoneme inference.

17. The method of claim 1 further comprising measuring the amount of noise in the morphed speech audio, wherein the loss function further depends on the amount of noise.

\* \* \* \* \*